(12) United States Patent
Revelino et al.

(10) Patent No.: US 7,540,549 B2
(45) Date of Patent: Jun. 2, 2009

(54) SINGLE ROLLER SLIDE-OUT MECHANISM

(75) Inventors: Larry Revelino, Norco, CA (US); John Pervorse, Corona, CA (US)

(73) Assignee: RBW Industries, Inc., Chino, CA (US)

( * ) Notice: Subject to any disclaimer, the term of this patent is extended or adjusted under 35 U.S.C. 154(b) by 0 days.

(21) Appl. No.: 11/618,610

(22) Filed: Dec. 29, 2006

(65) Prior Publication Data

US 2007/0176451 A1 Aug. 2, 2007

Related U.S. Application Data

(60) Provisional application No. 60/763,330, filed on Jan. 30, 2006.

(51) Int. Cl.
*B60P 3/34* (2006.01)

(52) U.S. Cl. .................................. 296/26.01; 296/26.13

(58) Field of Classification Search ............. 296/26.01, 296/26.11, 26.09, 26.13
See application file for complete search history.

(56) References Cited

U.S. PATENT DOCUMENTS

| | | |
|---|---|---|
| 1,521,635 A | 1/1925 | Lewis |
| 2,842,972 A | 7/1958 | Houdart |
| 3,106,750 A | 10/1963 | Jarman |
| 3,137,041 A | 6/1964 | Mullen |
| 3,797,880 A | 3/1974 | Pezzaglia |
| 4,133,571 A | 1/1979 | Fillios |
| 4,253,283 A | 3/1981 | May |
| 4,480,866 A | 11/1984 | Komatsu |
| 4,500,132 A | 2/1985 | Yoder |
| 4,685,857 A | 8/1987 | Goeser et al. |
| 4,955,661 A | 9/1990 | Mattice |
| 5,067,589 A | 11/1991 | Bartnicki |
| 5,092,650 A | 3/1992 | Perlot |
| 5,121,018 A | 6/1992 | Oldakowski |
| 5,127,697 A | 7/1992 | St. Marie |
| 5,154,469 A | 10/1992 | Morrow |
| 5,237,782 A | 8/1993 | Cooper |
| 5,332,276 A | 7/1994 | Blodgett, Jr. |
| 5,333,420 A | 8/1994 | Eden |
| 5,491,933 A | 2/1996 | Miller et al. |
| 5,577,351 A | 11/1996 | Dewald et al. |
| 5,577,578 A | 11/1996 | Lazorchak |
| 5,620,224 A | 4/1997 | DiBiagio et al. |
| 5,706,612 A | 1/1998 | Tillett |
| 5,758,918 A | 6/1998 | Schneider et al. |
| 5,785,373 A | 7/1998 | Futrell et al. |

(Continued)

FOREIGN PATENT DOCUMENTS

EP 0 083 317 A2 7/1983

(Continued)

*Primary Examiner*—Dennis H Pedder
(74) *Attorney, Agent, or Firm*—Inskeep IP Group, Inc.

(57) ABSTRACT

In one embodiment, the present invention provides a slide-out system comprising an inner rail that slides into and out of an inner rail. The inner rail is supported within the outer rail by a single support roller and a retaining slide, while a rail gear drives a gear rack on the inner rail to cause extension or retraction. This arrangement allows the rails of the slide-out system to be narrower than those used in many popular flush-floor slide-out systems in use today.

18 Claims, 9 Drawing Sheets

U.S. PATENT DOCUMENTS

| | | | |
|---|---|---|---|
| 5,787,650 | A | 8/1998 | Miller et al. |
| 5,788,306 | A | 8/1998 | DiBiagio et al. |
| 5,791,715 | A | 8/1998 | Nebel |
| 5,829,945 | A | 11/1998 | Stanley |
| 5,833,296 | A | 11/1998 | Schneider |
| 5,853,215 | A | 12/1998 | Lowery |
| 5,857,733 | A | 1/1999 | Dewald et al. |
| 5,902,001 | A | 5/1999 | Schneider |
| 5,915,774 | A | 6/1999 | Tiedge |
| 5,984,396 | A | 11/1999 | Schneider |
| 6,108,983 | A | 8/2000 | Dewald et al. |
| 6,109,683 | A | 8/2000 | Schneider |
| 6,116,671 | A | 9/2000 | Schneider |
| 6,176,045 | B1 | 1/2001 | McManus et al. |
| 6,199,894 | B1 | 3/2001 | Anderson |
| 6,234,566 | B1 | 5/2001 | Cyr et al. |
| 6,257,638 | B1 | 7/2001 | Graber |
| 6,266,931 | B1 | 7/2001 | Erickson et al. |
| 6,286,883 | B1 | 9/2001 | Schneider et al. |
| 6,293,611 | B1 | 9/2001 | Schneider et al. |
| 6,338,523 | B1 | 1/2002 | Rasmussen |
| 6,416,136 | B1 | 7/2002 | Smith |
| 6,428,073 | B1 | 8/2002 | Blodgett, Jr. |
| 6,454,336 | B1 | 9/2002 | Nye et al. |
| 6,494,518 | B2 * | 12/2002 | Kreil et al. ............... 296/26.01 |
| 6,601,896 | B1 | 8/2003 | Nye et al. |
| 6,619,714 | B2 | 9/2003 | Schneider et al. |
| 6,658,798 | B1 * | 12/2003 | Frerichs et al. ............... 52/67 |
| 6,729,669 | B2 | 5/2004 | McManus et al. |
| 7,066,528 | B1 | 6/2006 | Crean |
| 7,150,482 | B1 | 12/2006 | Blodgett, Jr. et al. |
| 7,240,938 | B1 | 7/2007 | Blodgett, Jr. |
| 7,293,814 | B2 | 11/2007 | Blodgett, Jr. |
| 2001/0002758 | A1 | 6/2001 | Hanser et al. |
| 2002/0084664 | A1 | 7/2002 | McManus et al. |
| 2002/0180232 | A1 | 12/2002 | Schneider et al. |
| 2004/0174031 | A1 | 9/2004 | Rasmussen |
| 2005/0225109 | A1 * | 10/2005 | Schneider ............... 296/26.01 |

FOREIGN PATENT DOCUMENTS

WO   WO98/56613  A1   12/1998

* cited by examiner

Figure 16

SINGLE ROLLER SLIDE-OUT MECHANISM

RELATED APPLICATIONS

This application claims priority to U.S. Provisional Application Ser. No. 60/763,330 filed Jan. 30, 2006 entitled Single Roller Slide-Out Mechanism and is hereby incorporated by reference.

BACKGROUND OF THE INVENTION

In order to increase the available interior space of a motorized or towable vehicle such as a motor home, trailer, or boat, these vehicles have been designed to include slide-out rooms. When the vehicle is in transit, the slide-out room is retracted and stored in the vehicle's interior with the exterior wall of the slide-out room approximately flush with the vehicle's exterior. As a result, there is typically adequate space within the vehicle's interior to accommodate users in transit and remain within the standard width limitations imposed upon a vehicle. When the vehicle is parked and leveled, the slide-out room is then slid outward through an opening formed in a sidewall of the vehicle thereby increasing the internal accommodations.

Typically, slide-out rooms include a floor section, a roof section, a first sidewall section, a second sidewall section, and a third sidewall section. In the retracted position, the roof section and the first and second sidewall section are concealed from exterior view, and the third sidewall section forms a portion of the vehicle's sidewall. At the same time, the floor section of the slide-out room typically rests above a floor section of a fixed room and may form a portion of the usable interior floor during vehicle transit. Similarly, the roof section of the slide-out room may define the interior ceiling of that part of the vehicle during transit. The proximal ends of the roof section, first sidewall section, and second sidewall section, include stop walls. As used herein, "proximal" refers to the portion towards the vehicle body and "distal" refers to the portion away from the vehicle body. The stop walls form an L-shaped configuration with the respective roof section, first sidewall section and second sidewall section. The stop walls engage the inner surface of a respective sidewall section of the fixed room when the slide-out room is fully extended, and thereby limit the travel of the slide-out room.

In the early phases of slide-out room design, the floor of the slide-out room would slide back and forth over the top of the interior vehicle floor. With these early designs, however, a step differential between the vehicle floor and the slide-out room floor existed, even when the slide-out room was fully extended. To some users, this type of design was inconvenient or unsightly.

As a result, some later slide-out rooms were designed so that the slide-out room floor became flush with the interior vehicle floor once the slide-out room was fully extended out from the vehicle. These designs became known as flush floor designs and examples can be found in U.S. Pat. Nos. 6,637, 794, 6,598,354, and 5,577,351, each of which is hereby incorporated herein by reference.

Regardless of which type of slide-out rooms are used today, the underlying structure that is used in such slide-outs is typically heavy and bulky. For example, U.S. Pat. No. 5,758,918, the contents of which are hereby incorporated by reference, includes wide, heavy sliding members. The substantial width of these sliding members is primarily due to their inclusion of dual rollers on either side of a gear and gear rack. While providing adequate support for a slide-out room, these sliding members require more material to manufacture, increasing both their production cost and weight.

As a result, there is a continuing desire in the industry to find yet a better and more efficient way of achieving a slide-out configuration.

OBJECTS AND SUMMARY OF THE INVENTION

It is an object of the present invention to overcome the limitations of the prior art.

It is another object of the present invention to provide a slide-out system that is less expensive to manufacture than prior art designs.

It is another object of the present invention to provide a slide-out system that is lighter than prior art designs.

In one embodiment, the present invention attempts to achieve these objects with a slide-out system comprising an inner rail that slides into and out of an inner rail. The inner rail is supported within the outer rail by a single support roller and a retaining slide, while a rail gear drives a gear rack on the inner rail to cause extension or retraction. The support roller is asymmetrically positioned under a width of the inner rail (e.q., on one side of the width of the rail). Similarly, the rail gear and gear rack are asymmetrically positioned under the width of the inner rail, opposite the support roller. Additional support is provided by a retaining slide attached to the inner rail that slides against retaining lip on the outer rail. In this respect, the single support roller, the retaining slide and, in some cases, the rail gear provide at least some support to the inner rail. This arrangement allows the rails of the slide-out system to be narrower than those used in many popular flush-floor slide-out systems in use today.

DETAILED DESCRIPTION OF THE INVENTION

FIGS. 1-9 illustrate a preferred embodiment of a slide-out system 100 according to the present invention which includes an outer rail 102 fixed to a vehicle 101 and an inner rail 104 coupled to a slide-out room 103. The outer rail 102 and the inner rail 104 are arranged in such a way, as described in detail below, as to reduce the complexity of the slide-out system 100, allowing for cost effective robotic welding. Further, the simplified design utilizes less raw material (typically steel) allowing for reductions in manufacturing costs and reductions in the final weight of the slide-out system 100.

Figure 1:
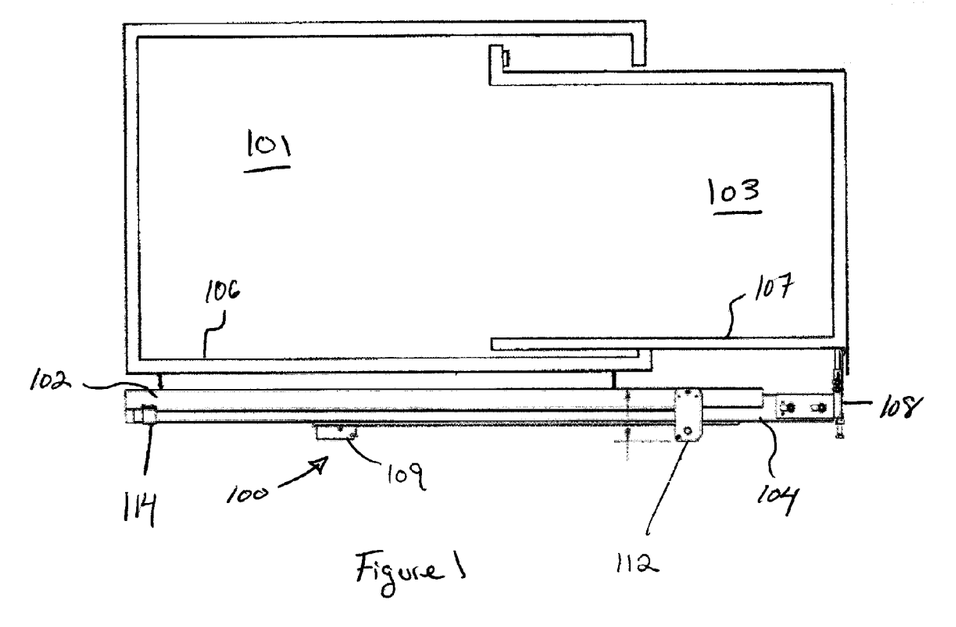
FIG. 1 illustrates a cross-sectional view of a vehicle with a slide-out system according to the present invention.
Figures 2, 4:
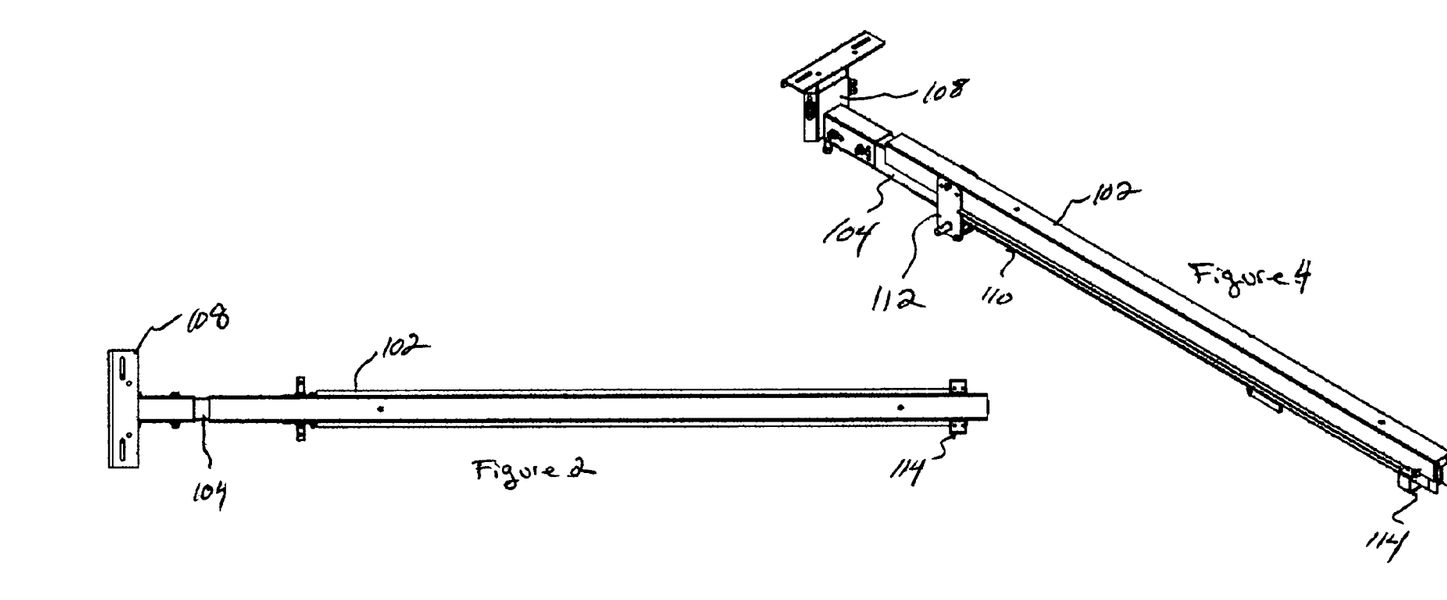
FIG. 2 illustrates a top view of the slide-out system according to the present invention.
FIG. 4 illustrates a side perspective view of the slide-out system according to the present invention.
Figure 3:
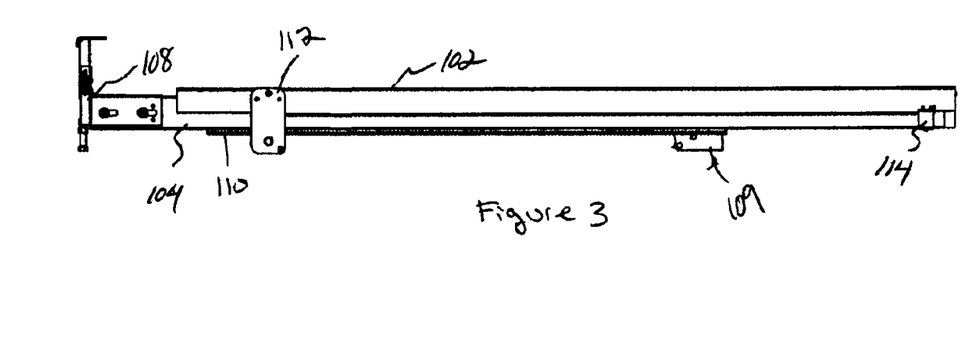
FIG. 3 illustrates a side view of the slide-out system according to the present invention.
Figure 5:
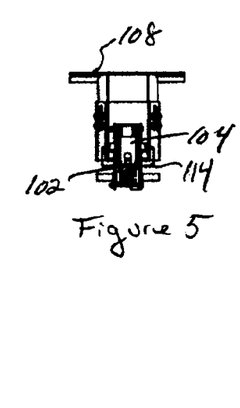
FIG. 5 illustrates an end view of the slide-out system according to the present invention.

Turning first to FIG. 1, a cross sectional view of the vehicle 102 is shown, including the slide-out room 103 which moves into and out of the slide-out room. Generally, the outer rail 102 is fixed below a main floor 106 of the vehicle 101 while the inner rail 104 is coupled to the bottom side of the floor 107 of the slide-out room 103 by a mounting bracket 108. The inner rail 104 slides into and out of the outer rail 102, urging the slide-out room 103 to similarly slide into and out of the vehicle 101.

Since the slide-out system 100 is positioned beneath the main floor 106 of the vehicle 101, the floor 107 of the slide-out room 103 can be positioned very close to the main floor 106. In this respect, there is a minimal floor height transition between the main room of the vehicle and the slide-out room 103.

Preferably, the outer rail 102 has a generally "U" shape, including a top region and two side regions that extend down from the edges of the top region. To maintain a desired strength, the outer rail 102 is preferably composed of steel or a metal with similar properties. The inner rail 104 is preferably a hollow, elongated structure sized to fit within the outer rail 102 as seen in the Figures, and is composed of a similar metal such as steel. Both the outer rail 102 and the inner rail 104, however, may have different shapes according to the present invention. For example, the inner rail 104 may have a shape similar to an I-beam or the outer rail 102 may extend around the inner rail 104, leaving only a narrow strip exposed down its middle.

As seen in FIGS. 2-8, a gear bracket 112 is mounted to each side of the outer rail 102, extending beyond the thickness of the inner rail 104. Each side of the gear bracket 112 is additionally locked together by a support bolt 112a, which provides further lateral stability to the gear rack 112, especially while the slide-out system 100 is in operation.

An axle 113 is rotatably coupled to each side of the gear bracket 112 to support a rail gear 118 and an adjacent support roller 116. The support roller 116 contacts a lower surface of the inner rail 104 to provide support for the inner rail 104 and ultimately to the slide-out room 103. The rail gear 118 is positioned adjacent to the support roller 116 and engages a rack 110 (e.g., a gear rack, chain, punched tube/metal, etc.) that is positioned along a portion of the inner rail 104.

Figures 6, 7:
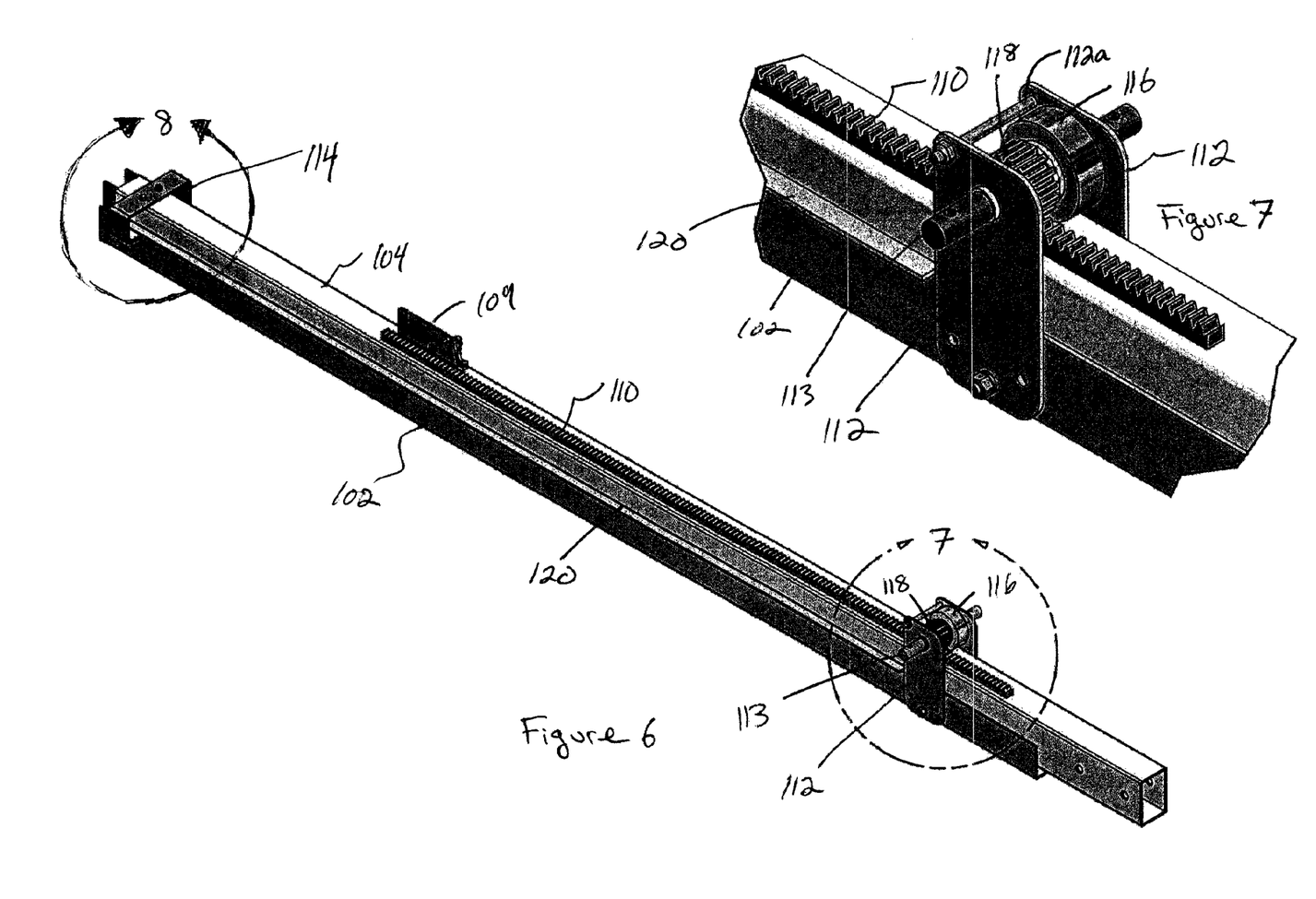
FIG. 6 illustrates a bottom perspective view of the slide-out system according to the present invention.
FIG. 7 illustrates an enlarged view of area 7 in FIG. 6 according to the present invention.

As best seen in FIG. 6, the inner rail 104 includes a stop 109 that contacts the support roller 116 when the inner rail 104 is in an extended position. This prevents the inner rail 104, and thus the slide-out room 103 from being over-extended and causing damage. Preferably, the position of the stop 109 is adjustable, allowing the maximum extension of the inner rail 104 to be adjusted to accommodate different sizes of slide-out rooms.

Figure 9:
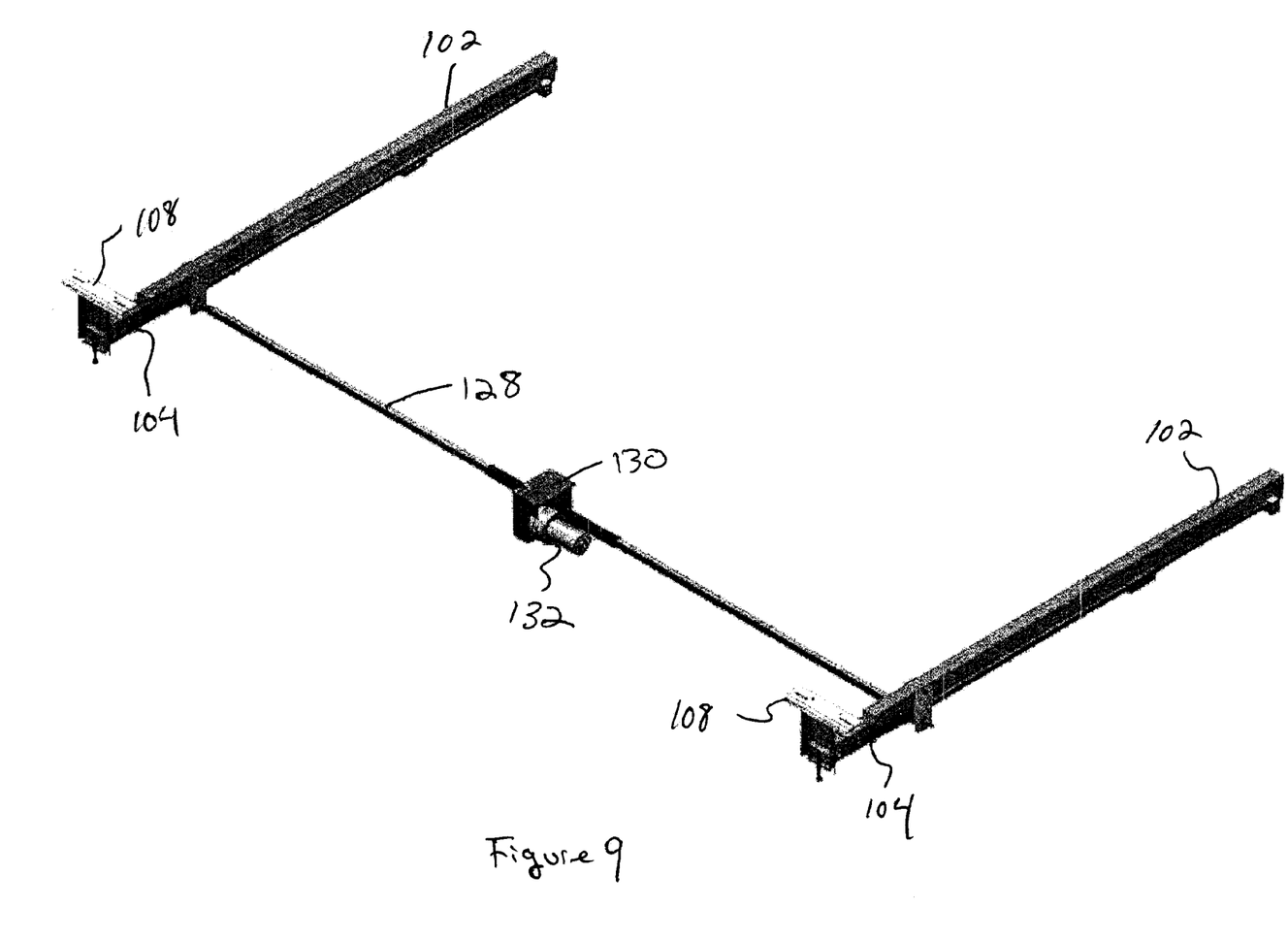
FIG. 9 illustrates a perspective view of the slide-out system according to the present invention.

As seen in FIG. 9, the axle 113 and thus the support roller 116 and rail gear 118, are connected to a drive shaft 128. The drive shaft 128 provides the rotational power generated from an electric motor 132 through gearbox 130. In this respect, the motor 132 causes the rail gear 118 to rotate in one direction or another and therefore urge the inner rail 104 in a proximal or distal direction in relation to the vehicle 101. Alternatively, the motor 132 may be located on or immediately adjacent to said outer rail so as to drive rail gear 118. Optionally, the motor 132 may also include a removable brake as known in the art.

Prior slide out designs, such as U.S. Pat. No. 5,758,918, the contents of which are incorporated by reference, have typically included at least two support rollers on either side of a gear rack, requiring a relatively wide rail structure and consequently requiring significantly more material to manufacture. However, the present invention provides more narrow rails 102 and 104 since only one support roller 116 is used adjacent to the gear rack 110 and rail gear 118. By providing more narrow rails 102 and 104, the present invention reduces the amount of material needed for the manufacturing process (typically steel) and therefore can provide a reduction in the manufacturing cost. Further, such material reductions of the present invention can lead to a lighter slide-out system 100, providing such benefits as cheaper shipping to customers and easier installation on vehicles.

Since the slide-out system 100 of the present invention preferably only includes a single support roller 116 underneath the inner rail 104 for each pair of rails 102 and 104, extension and retraction of the slide-out room 103 may produce various vertical forces (against the outer rail 102 or away from it). In order to maintain a desired position of the distal or inner end (i.e. the end shown in FIG. 8) of the inner rail 104, the present invention includes a retaining slide 114 and an inner roller 124.

Figure 8:
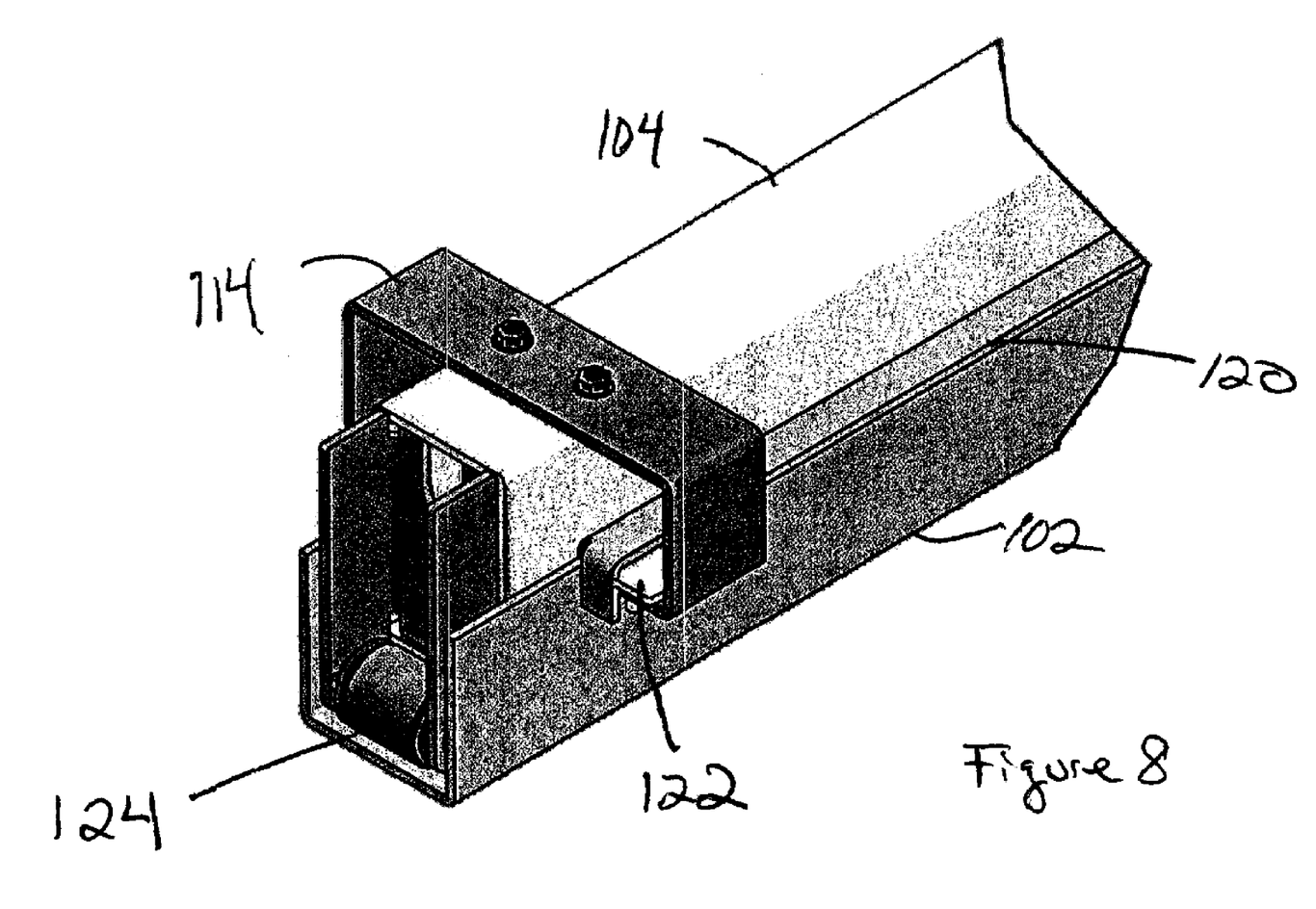
FIG. 8 illustrates an enlarged view of area 8 in FIG. 6 according to the present invention.

The retaining slide 114 (also known as a retaining member), seen best in FIGS. 6 and 8, includes two sides extending around the inner rail 104 and further positioned to engage a retaining lip 120 (also known as a retaining ridge) on each side of the outer rail 102. Preferably, the retaining lip 120 extends perpendicular from the side of the outer rail 102 which allows the sides of the retaining slide 114 to evenly contact its main surface. To reduce wear and decrease friction, the retaining slide 114 also includes low friction pads 122, preferably composed of a material such as Teflon or UHMW. In this respect, the retaining slide 114 prevents the distal end of the inner rail 104 from moving vertically away from the outer rail 102 during extension or retraction.

The inner roller 124, best seen in FIG. 8, is located at the end of the inner rail 104 and positioned to contact an upper, inner surface of the outer rail 102. Preferably, the inner roller 124 is positioned so as to maintain a position of the inner rail 104 to cause engagement of the retaining slide 114 with the retaining lip 120. Thus, the inner roller 124 prevents the distal end of the inner rail 104 from moving against and dragging on the outer rail 102, maintaining a desired distance between the two rails 102 and 104 while preventing significant friction during operation.

In a preferred embodiment, the side walls of the outer rail 102 have a constant height along the length of the outer rail 102. Similarly, along its length, the retaining lip 120 is located at substantially the same distance from the horizontal top surface of the outer rail 102. Thus, the inner rail 104 therefore the slide-out room 103 keeps a relatively even level when sliding in or out. However, it should be noted that the present invention also contemplates a preferred embodiment where the inner rail 104 changes its angle during extension or retraction. For example, the height of the side walls of the outer rail 102 may vary in length, causing the inner rail 104 and thus the slide-out room 103 to achieve either an incline or decline as extension or retraction occurs. An example of such an angled slide-out room can be seen in U.S. patent application Ser. No. 10/914,567 entitled Slide Mechanism With Elevation Adjustment, the contents of which are hereby incorporated by reference.

As seen in FIG. 9, the slide-out system 100 of the present invention can include multiple pairs of inner and outer rails 102 and 104, depending on the size and weight of the slide-out room 103.

In an alternative embodiment, the motor 132 could be directly connected to a rail gear 118 of only one pair and an axle could be coupled to each gear rack to distribute the force of the motor 132.

In operation, the user activates the motor 132, which rotates the gears within gear box 130, rotating drive shaft 128 and thus turning the rail gear 118. As the rail gear 118 rotates, it moves against the gear rack 110, causing the inner rail 104 to move out from the outer rail 102. As the inner rail extends, the retaining slide 114 and the inner roller 124 maintain a desired position of the distal end of the inner rail 104. Through the mounting bracket 108, the inner rail 104 urges the slide-out room 103 to extend from the vehicle 101.

When the user wishes to retract the slide-out room 103 back into the vehicle 101, the motor 132 is again activated in a reverse direction, causing the gear box 130, drive shaft 128, and rail gear 116 to rotate in a reverse direction. The rail gear 116 similarly moves against the gear rack 110, causing the inner rail 104 to move into the outer rail 102. As the inner rail 104 retracts, the slide-out room 103 similarly retracts until the slide-out room 103 is in a completely retracted position.

FIGS. 10-19 illustrate an alternate preferred embodiment of a slide-out system 200 according to the present invention which includes a generally similar design to the previously described slide-out system 100. Specifically, the slide-out system 200 includes an outer rail 202 fixed to a vehicle and an inner rail 204 coupled to the slide-out room. As with the previously described embodiments, a gear bracket 212 mounts to the outer rail 202 to support an axle 213. A support roller 216 on the axle 213 contacts and supports a lower surface of the inner rail 204 while a drive rail gear 218 on the axle 213 meshes with a gear rack 210, driving the inner rail 204 into and out of the outer rail 202.

As seen in FIGS. 10, 11, 13, 14, and 17-19, the outer rail 202 includes a lower lip 202B having a generally perpendicular shape relative to the sidewall and angled towards the center of the outer rail 202. Additionally, a mid-level lip 202A is also included, having a generally perpendicular shape relative to the sidewall and angled away from the center of the outer rail 202. This "G" shape can best be seen in the rear profile perspective of FIG. 14, which also shows a backstop 202C which prevents the inner rail 204 from retracting into the vehicle far enough to cause damage.

Unlike the slide-out system 100, the slide-out system 200 does not require a retaining slide 114, since the inner rail 204 is retained by sitting on and therefore sliding on the lower lip 202B. Preferably, the upper surface of the lower lip 202B includes a low friction material to facilitate sliding of the inner rail 204. The mid-level lip 202A is shaped and positioned similarly to the lip 120 of the previous preferred embodiment, however, this lip 202A does not provide any primary support to the inner rail 104, instead adding strength to the outer rail 202. In this respect, the present slide-out system 200 requires less material and parts than the previously described slide-out system 100.

Figures 10, 11, 12:
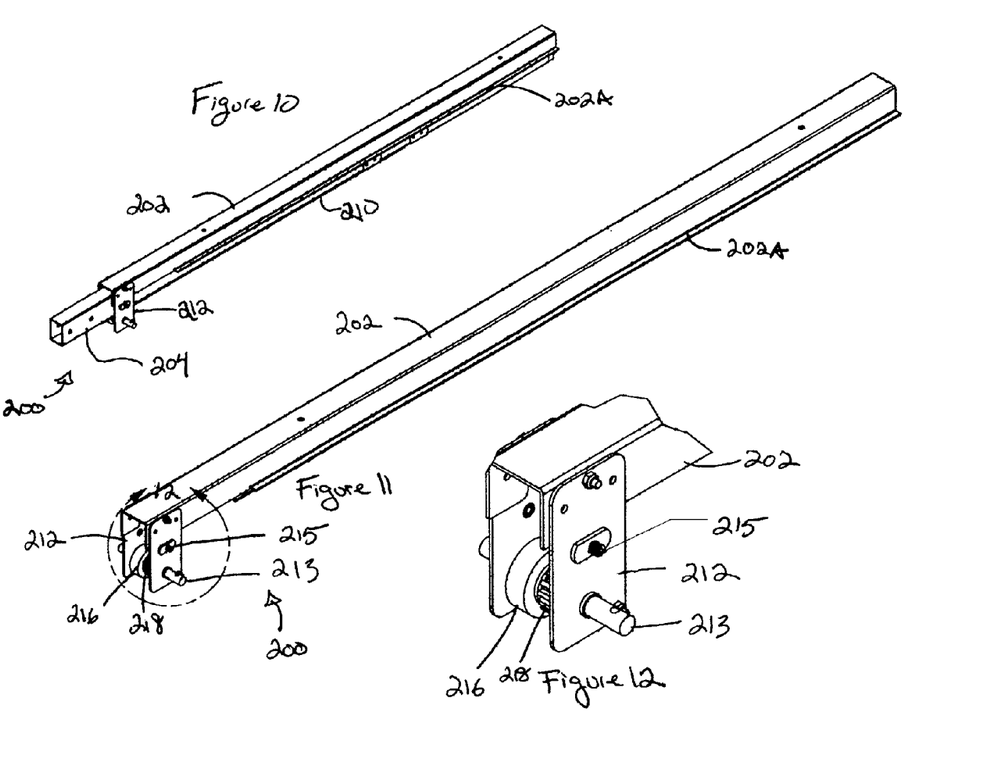
FIG. 10 illustrates a perspective view of another slide-out system according to the present invention.
FIG. 11 illustrates a perspective view of the slide-out system of FIG. 10 according to the present invention.
FIG. 12 illustrates a perspective view of the slide-out system of FIG. 10 according to the present invention.
Figure 13:
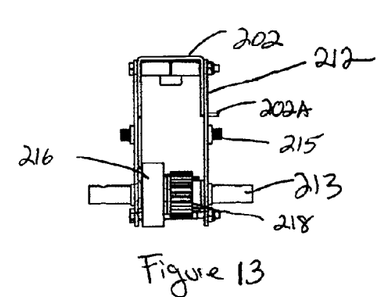
FIG. 13 illustrates a profile view of the slide-out system of FIG. 10 according to the present invention.
Figure 14:
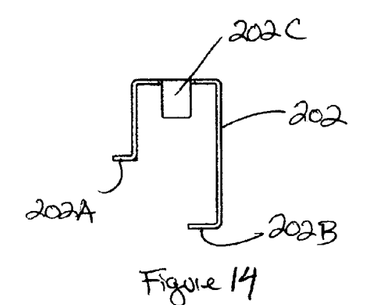
FIG. 14 illustrates a back profile view of an outer rail of the slide-out system of FIG. 10 according to the present invention.
Figure 15:
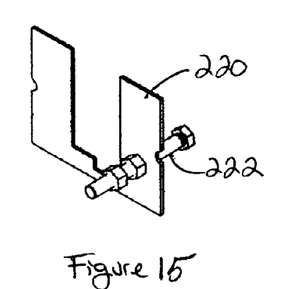
FIG. 15 illustrates a perspective view of a chassis plate of the slide-out system of FIG. 10 according to the present invention.
Figure 16:
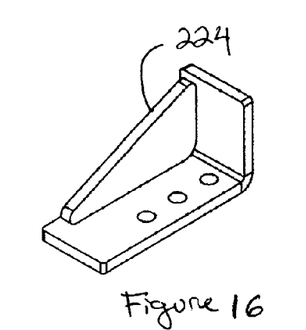
FIG. 16 illustrates a perspective view of a stop bracket of the slide-out system of FIG. 10 according to the present invention.

As seen best in FIGS. 12 and 13, the gear bracket 212 includes tracking screws 215 on each side of the bracket 212 which adjust into and out of the gear bracket 212 to press against the inner rail 204. In this respect, the tracking screws 215 maintain a horizontal alignment of the inner rail 204, allowing a user or manufacture to manually adjust the tracking at the outer end of the outer rail 202.

Figures 17, 18, 19:
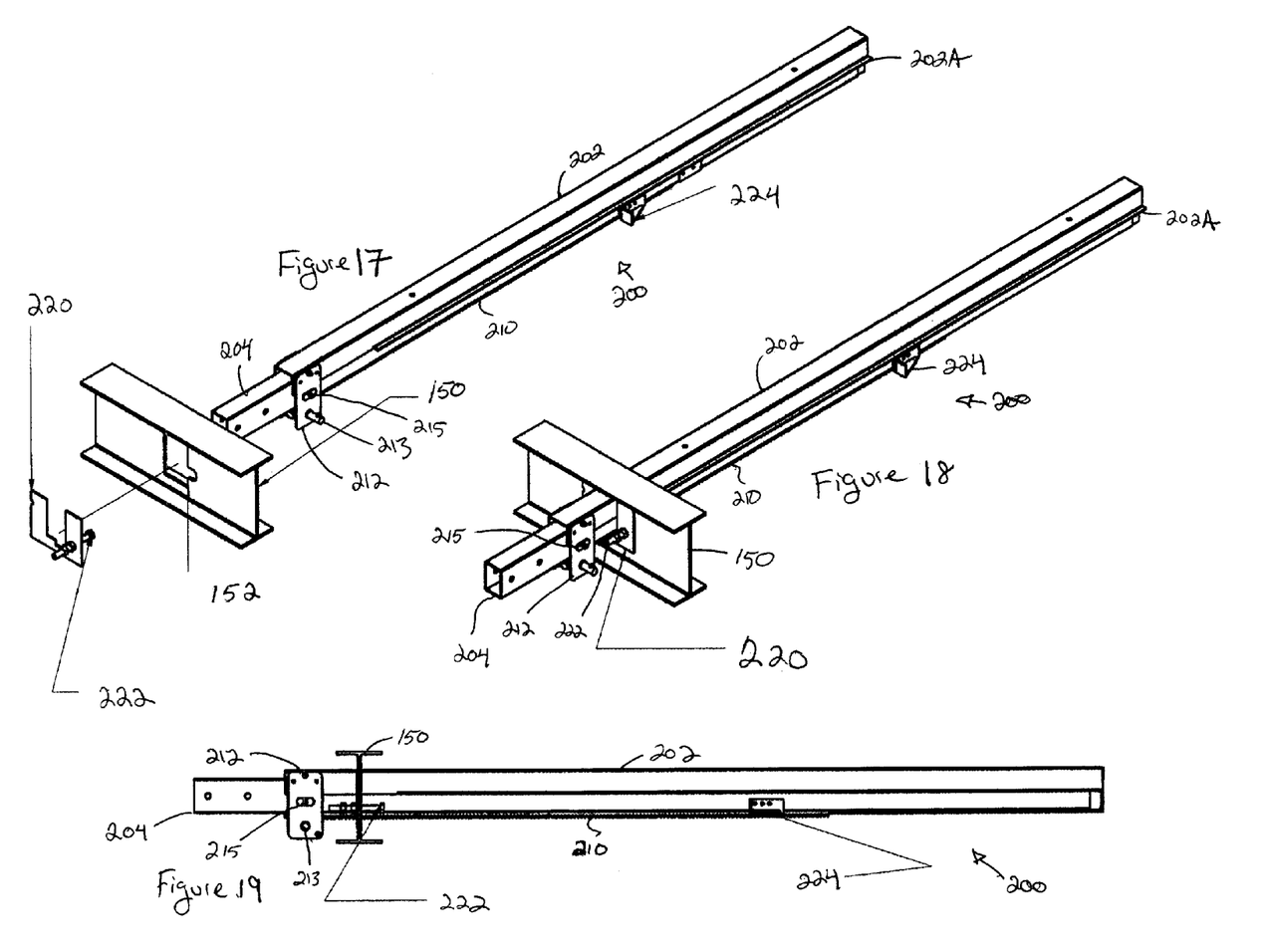
FIGS. 17-19 illustrate various views of the slide-out system of FIG. 10 according to the present invention.

As seen in FIGS. 15-19, the slide-out system 200 also includes a stop bracket 224 and an adjustable stop bolt 222 which allow a user to adjust a maximum stopping point for the inner rail 204 to extend out from the outer rail 202. The stop bracket 224 is positioned on one side of the inner rail 204 so that one surface on the bracket 224 is perpendicular to the side of the inner rail 204. The adjustable stop bolt 222 is positioned through a chassis plate 220 that fits around a portion of the outer rail 202 and is further mounted to a vehicle structural beam 150 around a slide-out opening 152, as best seen in FIGS. 17 and 18. To adjust the position at which the inner rail 204 is prevented from further extension, the user adjusts nuts on either side of the bolt 222, causing the bolt to move either towards or away from the gear bracket 212, as best seen in FIG. 19. In this respect, the horizontal position of the bolt 222 can be laterally secured in a range of different positions to allow the inner rail 204 to be stopped in a desired position.

Figures 20, 21:
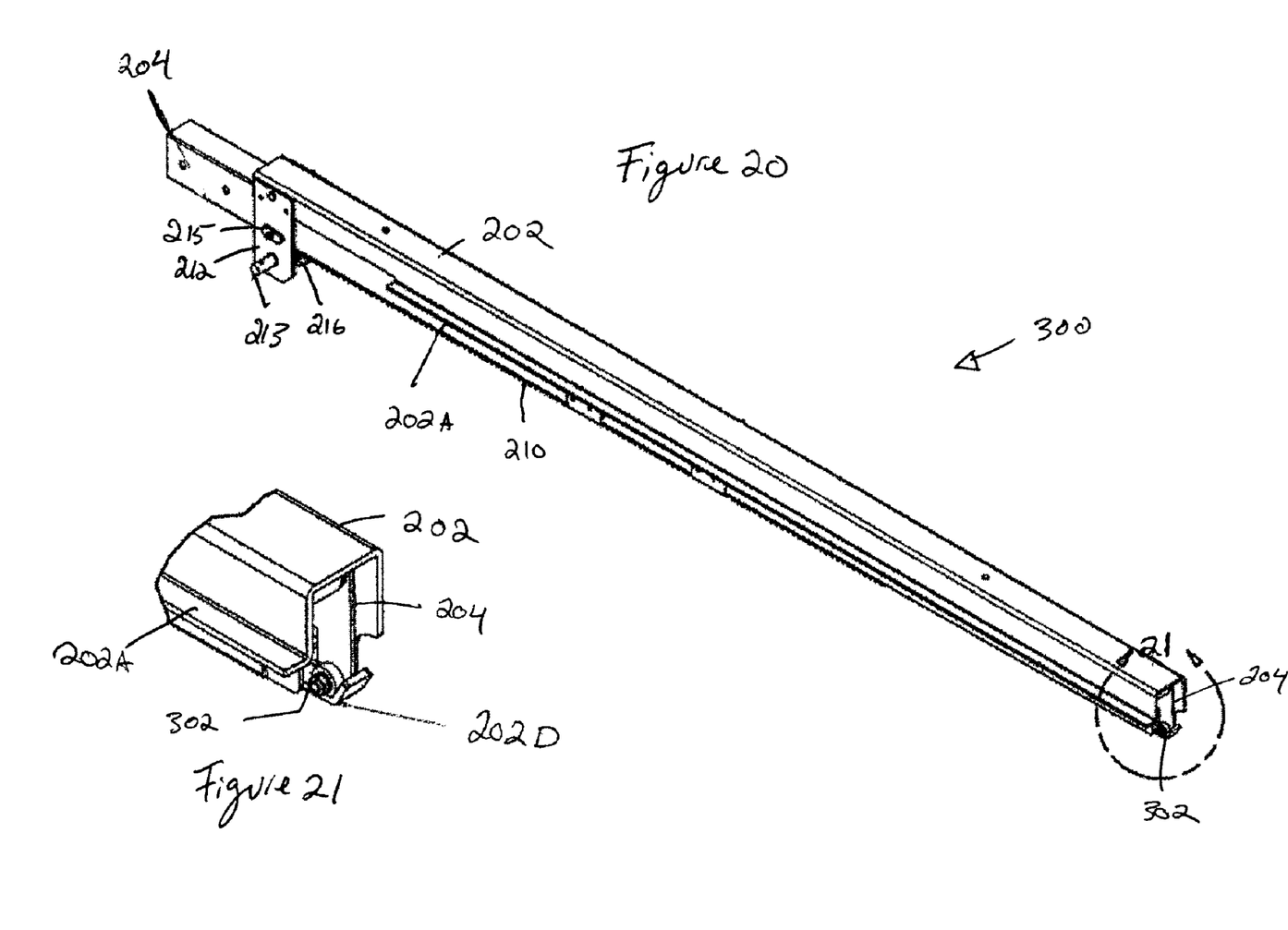
FIG. 20 illustrates a perspective view of a slide-out system according to a preferred embodiment of the present invention.
FIG. 21 illustrates an enlarged view of area 21 of FIG. 20 according to the present invention.

FIGS. 20 and 21 illustrate another preferred embodiment of a slide-out system 300 which is generally similar to the previously described slide-out system 200. However, as best seen in FIG. 21, the slide-out system 300 includes a roller 302 rotatably mounted to the rear end of the inner rail 204 to contact the lower lip 202B. In this respect the roller 302 reduces friction between the inner rail 204 and the outer rail 202. As best seen in FIG. 21, the lower lip 202B includes a tab 202D which is angled or bent upwards (i.e., towards the opposite side of the outer rail 202). The tab 202D acts as a backstop or area of increasing resistance as the inner rail 204 fully retracts into the outer rail 202.

It should be understood that different elements of the previously described embodiments may be combined with other embodiments according to the present invention. For example, the tracking screws 215 may be combined with the slide-out system 100. In another example, the stop bolt 222 and the stop bracket 224 may be used with slide-out system 100.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A slide-out mechanism for a vehicle comprising:
   an outer member;
   an inner member positioned at least partially within said outer member, including a rack member disposed along a bottom surface of said inner member; said rack member asymmetrically positioned along a width of said inner member;

an axle rotatably mounted within a bracket and positioned beneath said inner member; and a member movement and support assembly comprising:

a gear disposed on said axle and positioned to engage said rack member;

said gear asymmetrically position relative to said width of said inner member; and a roller disposed on said axle and positioned to contact said bottom surface of said inner member; said roller asymmetrically positioned relative to said width of said inner member.

2. The slide-out mechanism of claim 1 wherein said bracket is disposed on said outer member.

3. The slide-out mechanism of claim 1 wherein said roller is positioned next to a second side of said bracket.

4. The slide-out mechanism of claim 1 wherein said gear is coupled to a motor.

5. The slide-out mechanism of claim 1 further comprising a retaining slide disposed on said inner member to engage a lip on said outer member.

6. The slide-out mechanism of claim 5 further comprising a second roller disposed on said inner member to contact a bottom surface of said outer member.

7. The slide-out system of claim 1 wherein said outer member includes a bottom lip contacting a portion of said bottom surface of said inner member.

8. A method of moving an extendable room of a vehicle comprising:

providing a vehicle having an extendable room and an outer member, said outer member having a retaining lip;

supporting an inner rail coupled to said extendable room with a single roller coupled to said outer member; said single roller asymmetrically positioned relative to a width of said inner rail;

supporting said inner rail with said retaining lip of said outer member;

rotating a gear asymmetrically positioned relative to a width of said inner rail to extend or retract said inner member from said outer member.

9. The method of claim 8 wherein said supporting said inner rail with said retaining lip of said outer member includes supporting said inner rail with a retaining slide engaged with said retaining lip.

10. The method of claim 8 wherein said supporting said inner rail with said retaining lip of said outer member includes contacting a bottom surface of said inner member with said retaining lip.

11. The method of claim 8 further comprising contacting an inner surface of said outer member with a second roller.

12. A system for expanding and retracting a slide-out room of a vehicle comprising:

an outer rail coupled to a vehicle;

an inner rail at least partially positioned within said outer rail and including a gear rack asymmetrically disposed along a bottom surface of said inner rail relative to a width of said inner rail, said inner rail coupled to a slide-out room; and a bracket assembly comprising a bracket fixed to said outer rail, a gear positioned asymmetrically relative to said width of the inner rail so as to engage said gear rack and a roller positioned asymmetrically relative to the width of the inner rail to contact said bottom surface of said inner rail adjacent to said gear rack.

13. The system of claim 12 further comprising a retaining ridge extending along a length of said outer rail and a retaining member disposed on said inner rail to engage said retaining ridge.

14. The system of claim 12 further comprising a stop member positioned on said inner rail.

15. The system of claim 12 wherein said outer rail includes an elongated portion having two sides positioned perpendicular to said elongated portion.

16. The system of claim 12 wherein said gear and said roller are fixed to a single axle.

17. The system of claim 12 further comprising a second roller rotatably disposed on said inner rail to contact a retaining ridge extending along the length of said outer rail.

18. The system of claim 17 wherein said retaining ridge includes a main region and an end region; said end region disposed at an angle relative to said main region.

* * * * *